US009603442B2

United States Patent
Jimenez et al.

(10) Patent No.: US 9,603,442 B2
(45) Date of Patent: Mar. 28, 2017

(54) ORAL CARE IMPLEMENT WITH FLUID APPLICATOR AND METHOD OF ASSEMBLING THE SAME

(75) Inventors: Eduardo J. Jimenez, Manalapan, NJ (US); Sharon Kennedy, Randallstown, MD (US)

(73) Assignee: COLGATE-PALMOLIVE COMPANY, New York, NY (US)

( * ) Notice: Subject to any disclaimer, the term of this patent is extended or adjusted under 35 U.S.C. 154(b) by 701 days.

(21) Appl. No.: 13/983,285

(22) PCT Filed: Feb. 1, 2011

(86) PCT No.: PCT/US2011/023346
§ 371 (c)(1),
(2), (4) Date: Aug. 1, 2013

(87) PCT Pub. No.: WO2012/105961
PCT Pub. Date: Aug. 9, 2012

(65) Prior Publication Data
US 2013/0309629 A1 Nov. 21, 2013

(51) Int. Cl.
*A61C 17/34* (2006.01)
*A46B 9/04* (2006.01)
(Continued)

(52) U.S. Cl.
CPC ........ *A46B 11/001* (2013.01); *A46B 11/0082* (2013.01); *B23P 11/02* (2013.01);
(Continued)

(58) Field of Classification Search
CPC ..... A46B 11/001; A46B 11/0082; B23P 11/02
(Continued)

(56) References Cited

U.S. PATENT DOCUMENTS

| 2,594,721 A | * | 4/1952 | Beebe | A45D 24/26 |
| | | | | 132/111 |
| 3,369,543 A | * | 2/1968 | Ronco | B65D 47/42 |
| | | | | 15/221 |

(Continued)

FOREIGN PATENT DOCUMENTS

| BE | 520 830 | 7/1953 |
| FR | 2 196 577 | 3/1974 |
| GB | 842 965 | 8/1960 |

OTHER PUBLICATIONS

International Search Report and Written Opinion of the International Searching Authority issued in International Application No. PCT/US2011/023346 mailed Oct. 28, 2011.

(Continued)

*Primary Examiner* — Mark A Laurenzi
*Assistant Examiner* — Thomas M Abebe

(57) ABSTRACT

An oral care implement, such as a toothbrush, having a wick applicator and a method of assembling the same. The implement includes a head, a handle connected to the head by a neck portion, and a recess. The recess is arranged for receipt of the wick applicator. The handle includes an internal fluid reservoir holding a fluid in communication with the recess. The wick applicator is arranged to enable a fluid to pass therethrough by capillary action and has a first end portion and a second end portion. The second portion of the wick applicator comprises at least one projection for engaging at least one cooperating portion of the recess to secure the wick applicator in the recess at an operative position, whereupon the wick applicator is in fluid communication with the fluid in the reservoir.

19 Claims, 2 Drawing Sheets

(51) Int. Cl.
*A46B 15/00* (2006.01)
*A45D 34/04* (2006.01)
*A46B 11/00* (2006.01)
*B23P 11/02* (2006.01)

(52) U.S. Cl.
CPC ....... *A46B 11/0062* (2013.01); *A46B 15/0081* (2013.01); *A46B 2200/1066* (2013.01)

(58) Field of Classification Search
USPC .................... 401/198, 199, 132, 186; 433/82
See application file for complete search history.

(56) References Cited

U.S. PATENT DOCUMENTS

| | | | | |
|---|---|---|---|---|
| 3,400,996 A * | 9/1968 | Vandergrift | ........ | A46B 11/0055 401/143 |
| 3,864,047 A * | 2/1975 | Sherrod | ............ | A46B 11/0058 132/308 |
| 3,937,235 A * | 2/1976 | Broughton | ......... | A46B 11/0017 132/308 |
| 4,124,316 A * | 11/1978 | O'Rourke | .......... | A46B 11/0041 401/184 |
| 4,615,635 A * | 10/1986 | Kim | ....................... | A46B 7/046 401/134 |
| 4,685,819 A * | 8/1987 | Endo | .................. | A46B 11/0058 401/151 |
| 5,611,687 A * | 3/1997 | Wagner | ................ | A45D 34/041 401/198 |
| 6,241,412 B1 * | 6/2001 | Spies | .................... | A46B 11/002 206/532 |
| 7,143,462 B2 * | 12/2006 | Hohlbein | ............... | A46B 9/026 15/106 |
| 7,845,042 B2 * | 12/2010 | Moskovich | .......... | A46B 5/0029 15/167.1 |
| 8,032,967 B2 * | 10/2011 | Jimenez | ............... | A61C 17/349 15/110 |
| 8,202,230 B2 * | 6/2012 | Gatzemeyer | ....... | A46B 11/0093 600/573 |
| 8,398,326 B2 * | 3/2013 | Jimenez | ............. | A46B 11/0082 401/198 |
| 8,506,196 B2 * | 8/2013 | Boyd | ................... | A46B 11/001 222/187 |
| 8,529,150 B2 * | 9/2013 | Olson | ...................... | A46B 5/02 15/167.1 |
| 8,757,912 B2 * | 6/2014 | Jimenez | ............. | A46B 11/0006 132/308 |
| 9,033,602 B2 * | 5/2015 | Boyd | ................. | A46B 11/0055 401/109 |
| 2004/0105715 A1 | 6/2004 | Spelman et al. | | |
| 2008/0176183 A1 * | 7/2008 | Gatzemeyer | ......... | A46B 11/001 433/82 |
| 2008/0201884 A1 * | 8/2008 | Vazquez | .................. | A46B 9/04 15/167.1 |
| 2010/0331725 A1 * | 12/2010 | Libby | ................ | A61B 10/0051 600/573 |
| 2011/0041275 A1 * | 2/2011 | Gatzemeyer | ....... | A46B 11/0093 15/210.1 |
| 2012/0275841 A1 * | 11/2012 | Jimenez | ............. | A46B 11/0006 401/140 |
| 2013/0266361 A1 * | 10/2013 | Gilbert | ..................... | A46B 9/04 401/137 |
| 2013/0330116 A1 * | 12/2013 | Mello | .................. | A46B 11/001 401/270 |
| 2014/0119809 A1 * | 5/2014 | Worthington | ...... | A46B 15/0081 401/283 |
| 2015/0342338 A1 * | 12/2015 | Kennedy | ............ | A46B 15/0061 401/119 |

OTHER PUBLICATIONS

Written Opinion of the International Preliminary Examining Authority issued in International Application No. PCT/US2011/023346 mailed Jan. 28, 2013.

* cited by examiner

ORAL CARE IMPLEMENT WITH FLUID APPLICATOR AND METHOD OF ASSEMBLING THE SAME

CROSS-REFERENCE TO RELATED PATENT APPLICATIONS

The present application is a U.S. national stage application under 35 U.S.C. §371 of PCT Application No. PCT/US2011/023346, filed Feb. 1, 2011, the entirety of which is incorporated herein by reference.

FIELD OF THE INVENTION

The present invention relates generally to oral care appliances or implements, e.g., toothbrushes, and more specifically to oral care appliances including a wick applicator for carrying fluid from an internal reservoir to the appliance's head.

BACKGROUND OF THE INVENTION

In co-pending U.S. patent application Ser. No. 12/717,755, entitled Fluid Dispensing Oral Care Implement, filed on Mar. 5, 2010, which is assigned to the same assignee as this invention and whose disclosure is incorporated by reference herein, there is disclosed a fluid dispensing oral care implement, e.g., a toothbrush, with fluid delivery system. The implement includes a storage member containing a fluid. A channel formed of one or more wick or capillary members extends through at least a portion of the oral care implement to deliver fluid(s) through one or more fluid outlets via capillary action. In one embodiment, the fluid outlet is comprised of a wick or capillary material and is disposed in the head of the implement. In some embodiments, the implement may include a valve and a specially configured storage cap. A variety of fluids can be administered for therapeutic, hygienic, and/or other benefits, such as fresh breath, tooth whitening, tooth sensitivity, plaque and/or tartar control, or producing sensations of heat, cool, or tingling.

For some applications it may be desirable to make use of an oral care implement having an externally located wick applicator, e.g., a wick applicator having a portion disposed within a recess or channel extending to the outer surface of the implement. In such a case it is desirable that the wick applicator and the implement in which it is located be configured so that when the wick applicator is disposed within the channel or recess it can be readily secured therein and once so secured be resistant to accidental displacement therefrom.

BRIEF SUMMARY OF THE INVENTION

Accordingly, one aspect of this invention entails 1. An oral care implement comprising a head; a handle connected to the head by a neck portion, said handle including an internal fluid reservoir for holding a fluid therein; a recess, said recess including a first portion extending along said head and a second portion extending into said neck and in fluid communication with said fluid reservoir; a wick applicator comprising: a member comprising a material arranged to enable a fluid to pass therethrough by capillary action and having a first end portion and a second end portion; wherein said first end portion of said wick applicator is arranged to be located within said first portion of said recess and with said second end portion being arranged to be located within said second portion of said recess; and wherein said second portion of said wick applicator comprises at least one projection for engaging at least one cooperating portion of said recess to secure said wick applicator in said recess at an operative position, whereupon said wick applicator is in fluid communication with said internal fluid reservoir.

A second aspect of the invention comprises a wick applicator, constructed as discussed above, for securement to an oral care implement constructed as discussed above.

A third aspect of the invention entails a method of securing a wick applicator to an oral care implement. That method comprises providing an oral care implement comprising a head, a handle and a recess. The handle is connected to the head by a neck portion and includes an internal fluid reservoir for holding a fluid therein. The recess includes a first portion extending along the head and a second portion extending into the neck. A wick applicator is also provided. The wick applicator is formed of a material arranged to enable a fluid to pass therethrough by capillary action and comprises a member having a first end portion, a second end portion and at least one projection extending outward from the second end portion. The wick applicator is arranged to be inserted into the recess wherein the first end portion of the wick applicator is in the first portion of the recess and the second end portion of the wick applicator is in the second portion of the recess, with the at least one projection engaging at least one cooperating portion of the recess to secure the wick applicator in the recess at an operative position, whereupon the wick applicator is in fluid communication with said internal fluid reservoir.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The invention will be illustrated with reference to the attached drawings, which are briefly described immediately below.

DETAILED DESCRIPTION OF THE INVENTION

Figure 1:
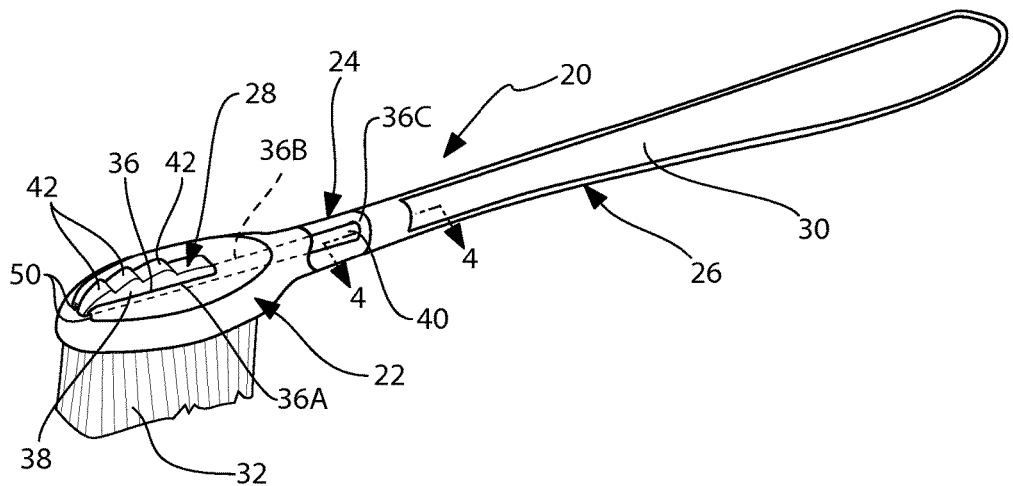
FIG. 1 is an isometric view of one exemplary embodiment of an oral care implement constructed in accordance with this invention.

The following description of the preferred embodiment(s) is merely exemplary in nature and is in no way intended to limit the invention, its application, or uses.

As used throughout, ranges are used as a shorthand manner for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

The invention is further described in the following examples. The examples are merely illustrative and do not in any way limit the scope of the invention as described and claimed. Referring now to the drawings wherein like reference numbers refer to like parts there is shown at 20 in FIG. 1 one exemplary embodiment of an oral care implement or appliance, e.g., a toothbrush, constructed in accordance with this invention. The oral care implement basically comprises a head portion 22, a neck portion 24, a handle portion 26 and a wick applicator 28. The head portion 22 is connected to the neck portion 24 and includes a working head. In the exemplary embodiment of the invention shown herein, i.e., a toothbrush, the working head includes tooth cleaning elements 32. The term "tooth cleaning elements" is used in a generic sense which refers to filament bristles or elastomeric fingers or walls that have any desirable shape. It should be understood that any bristle/elastomeric finger configuration and any handle configuration can be used, and the present invention should not be regarded as being limited to any particular configuration.

The handle portion 26 is connected to the neck portion 24 at the opposite end from the head portion 22 and includes an internal reservoir 30 containing at least one fluid. The fluid is most often in the form of a liquid, but can be in other forms, e.g., semi-solid, paste, gel, etc. so long as it is capable of flowing. In some embodiments the fluid is or contains an oral care agent, but the invention is not so limited. A variety of fluids can be administered for therapeutic, hygienic, and/or other benefits, such as fresh breath, tooth whitening, or producing sensations of heat, cool, or tingling. The fluid can be incorporated into the reservoir 30 during manufacture of the implement in which case the implement can be disposed of after the supply of the fluid is exhausted. Alternatively, the reservoir 30 can be refillable through an inlet (not shown), and/or can be replaceable, e.g., by inserting a replaceable cartridge into a recess in the implement. The reservoir 30 can contain a quantity of the oral care agent medium intended for a single use or a small number of uses, or may facilitate repeated use over an extended period of time, e.g., up to several months or several years. The size of the reservoir 30 can be selected to be compatible with the desired overall dimensions of the toothbrush as well as such factors as the stability of the oral care agent and the quantity of medium administered during each application.

The wick applicator serves as the means for carrying the fluid from the reservoir 30 to the head portion 22, whereupon it can be applied to the desired portion of the user's mouth, e.g., teeth, tongue, gums (as the case may be, depending upon the type of fluid used). To that end, the wick applicator 28 is arranged to be fixedly secured at an operative or locked position within a recess or channel 36 (to be described later) in communication with the reservoir 30 to carry the fluid to the head portion 22 by capillary action. Thus, the wick applicator is constructed from a fibrous material, ceramic, porous plastic, or combination thereof. Examples of suitable materials include fibrous materials, ceramics, and porous plastics such as those available from Porex Technologies, Atlanta, Ga. One example of a fibrous material is an acrylic material identified as type number C10010, available from Teibow Hanbai Co., Ltd., Tokyo, Japan. A mixture of porous and/or fibrous materials may be provided which have a distribution of larger and smaller capillaries.

Before describing the details of the wick applicator 28 and the manner in which it is mounted in the implement 20, further details of the implement 20 are in order. To that end, its tooth cleaning elements 24 may comprise bristles and/or elastomeric cleaning elements. The reservoir 30 is located in the handle portion 26 and includes a portion extending up to a wall 34 (FIGS. 2 and 4) in the neck portion 24. The reservoir 30 may be a hollow chamber or may be filled with any suitable porous material, e.g., it may include reticulated foam, which may range from hydrophilic to hydrophobic. Hydrophobic foams may be used with non-water based liquids. An example of reticulated foam is Bulpren S90, manufactured by Recticel (Wetteren, Belgium). Bulpren S90 is an open cell polyurethane foam based on polyester which averages 90 pores per inch. Hydrophilic foams may be used with water based liquids. Other examples of materials that can be used for the reservoir 30 include ceramics and porous plastics. For example, the reservoir 30 may be a commercially available bonded fiber component from Filtrona or Porex, such as without limitation polypropylene, polyethylene, or copolymers of such polymers in varying ranges of hydrophobicity depending on the composition selected. If desired the handle portion 26 of the implement may be formed so that it is transparent or partially transparent to enable the user to see how much fluid is within the reservoir 30.

Figure 2:
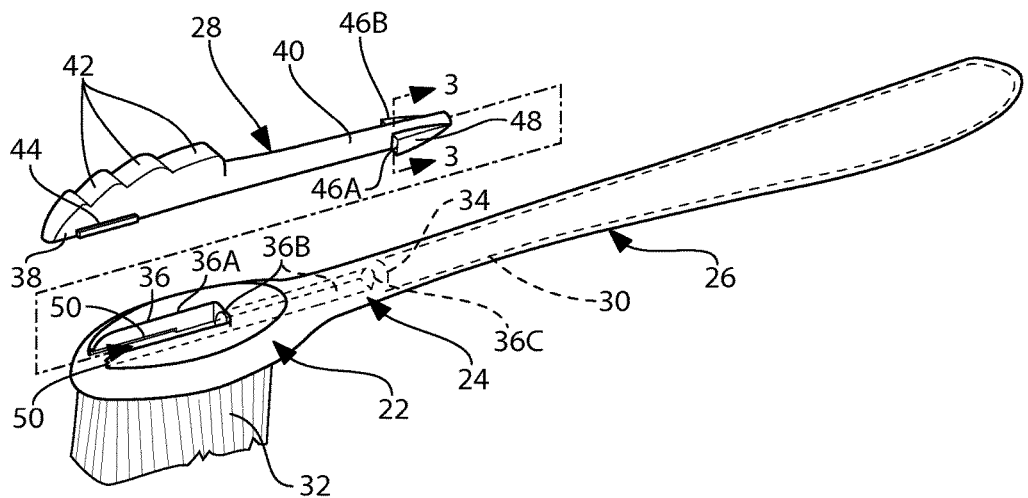
FIG. 2 is an exploded isometric view of the embodiment of the oral care implement shown in FIG. 1.
Figure 4:
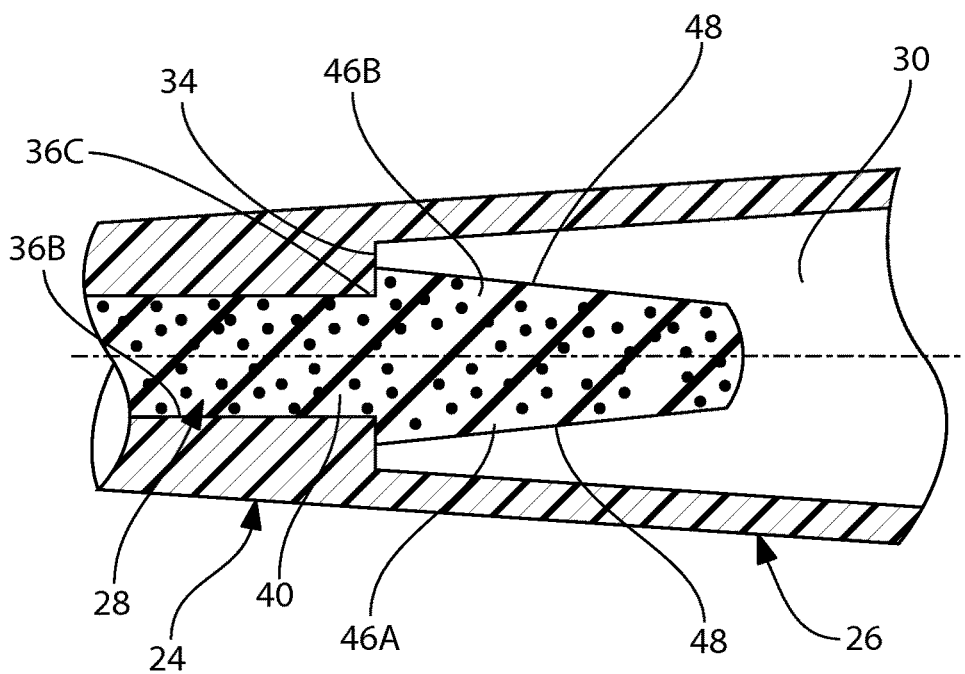
FIG. 4 is a plan view, partially in section, showing the manner of securement of the wick applicator to the handle portion of the implement of FIGS. 1 and 2.

As mentioned earlier, the reservoir 30 is in fluid communication with a channel or recess 36 in the implement 20. The recess 36 is located in the head portion 22 and neck portion 24 of the implement 20. The recess 36 is best seen in FIG. 2 and, in this exemplary embodiment, is located on the opposite side of the head portion as the cleaning elements 24. The recess can, however, be located at another portion of the implement, e.g., on the side of the implement from which the cleaning elements extend. In any case, the recess 36 is configured to closely receive the wick applicator 28 therein. In particular, the recess 36 includes an open distally located, linear slot portion 36A which extends to the distal end of the implement. As best seen in FIG. 4 the proximal end of the recess 36 is in the form of an internal passageway 36B extending longitudinally through the head and neck portion of the implement 20 and terminates at a hole or aperture 36C in the heretofore identified wall 34 at the distal end of the reservoir 30.

Figure 3:
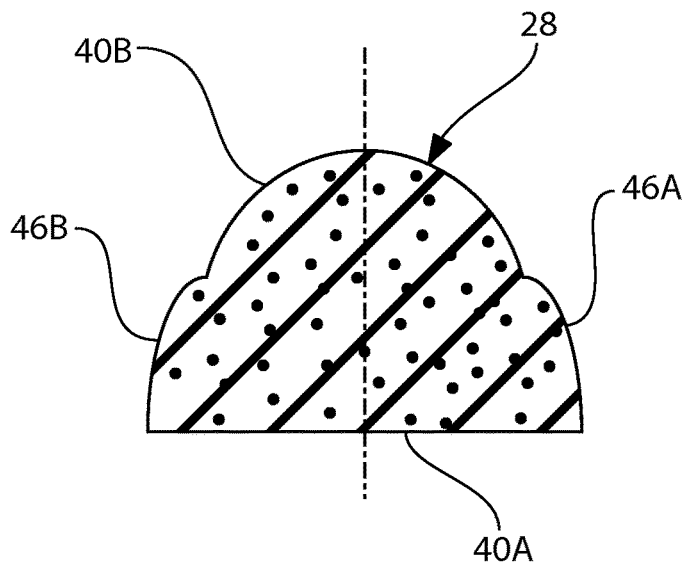
FIG. 3 is an enlarged sectional view taken along line 3-3 of FIG. 2.

The wick applicator 28 is best seen in FIG. 2 and basically comprises a unitary member including distal or forward section 38 and a proximal or rear section 40. The proximal section 40 is best seen in FIGS. 2 and 3 and basically comprises an elongated body having generally planar bottom wall 40A and an arcuate side/top wall 40B extending the length of the section 40. The distal section 38 is a member having a generally planar bottom wall which is coplanar with the bottom wall 40A of the section 40. The upper wall of the distal section 38 of the applicator 28 is of somewhat generally arcuate shape at the distal end thereof and includes a plurality of somewhat arcuate ridges or serrations 42 extending along the periphery of the upper wall. The serrations 42 are provided to enable the wick applicator portion 28 of the implement 20 to serve as a tissue cleaner, which can be used, for example, for cleaning the tongue, cheeks, lips, and/or gums. Such tissue engaging elements can help reduce a major source of bad breath and improve hygiene. For such applications the wick applicator 28 may be formed of a variety of suitable biocompatible resilient materials, such as elastomeric materials, provided that they are sufficiently porous to enable the fluid to pass therethrough by capillary action. To provide optimum comfort as well as cleaning benefits, an elastomeric material usually has a hardness property in the range of A8 to A25 Shore hardness, such as styrene-ethylene/butylene-styrene block copolymer (SEBS), available from GLS Corporation. The size, shape and material of construction of the wick applicator 28 are not limiting of this invention and can be determined by such factors as the intended volume of oral care fluid do be delivered during the life of the oral care implement 20, the rate and frequency of delivery of the fluid to a user and the size of the oral care implement 20.

The wick applicator 28 may be constructed so that its distal section 38 includes other tissue cleaning features than the serrations 42 shown. For example, the outer surface of the distal section 38 may be configured to include a multiplicity of tissue engaging elements, which can be formed as nubs. As used herein, a "nub" is generally meant to include a column-like protrusion (without limitation to the cross-sectional shape of the protrusion) which is upstanding from a base surface. In general, the nub can have a height that is greater than the width at the base of the nub as measured in the longest direction. Nubs also can include projections wherein the widths and heights are roughly the same or wherein the heights are somewhat smaller than the base widths. In fact, if desired, the wick applicator may be devoid of any tissue cleaning features, and instead have an outer surface which is of the same contour as the surrounding portion of the head and neck of the implement, for applications where the sole function of the wick applicator is to deliver fluid to the head of the implement.

As best seen in FIG. 2 pair of ribs or flanges 44 projects outward from the sidewalls of the distal section 38 of the wick applicator 28 adjacent its bottom wall. Those ribs 44 extend parallel to the longitudinal axis of the wick applicator 28 and to its bottom wall 40A. The ribs 44 are arranged to cooperate with portions 50 of the recess 36, which will be described shortly, to serve as a means for guiding the insertion of the wick applicator into the recess to its operative or locked position. That position is as shown in FIG. 1. When the wick applicator 28 is in its operative or locked position its proximal end portion extends through the aperture or hole 36C in the wall 34 and into the reservoir 30 for engagement with the fluid therein. This arrangement enables the fluid in the reservoir 30 to enter and flow down the wick applicator 28 by capillary action. The insertion and guidance of the wick applicator 28 in and along the recess 36 to its operative or locked position is effected by the ribs 44 engaging a pair of undercut recessed portions 50 of the recess 36 which extend from the distal end of the recess inward (proximally). Each of those undercut recessed portions 50 is of complementary shape to the each of the ribs 44.

In order to fixedly secure the wick applicator 28 at its operative or locked position the proximal end 40 of the wick applicator 28 includes a pair of projections 46A and 46B for engaging a cooperating portion of the recess 36. In particular, each projection 46A and 46B is in the form of a barb having an external tapered surface 48 which tapers downward toward the proximal free end of the wick applicator 28. The forward edge surface of each of the barbs 46A and 46B is undercut and arranged to engage and abut the surface of the wall 34 contiguous with the opening 36C as best seen in FIG. 4 when the proximal end 40 of the wick applicator 28 is extended through that opening into the fluid reservoir 30. In accordance with one preferred aspect of this invention the barbs 46A and 46B are constructed to be compressible to compress inward to enable the proximal end 40 of the wick applicator 28 to pass through the internal passageway 36B of the recess 36. In particular, as the tapered surfaces 48 of the barbs 46A, 46B engage the inner wall of the passageway 36B they collapse inward. Once the barbs 46A, 46B have passed fully through the opening 36C in the wall 34 they decompress or spring back to their original state so that the undercut surfaces at the forward end of the barbs 46A, 46B engage the surface of the wall 34 contiguous with the opening 36C. This action effectively locks the wick applicator 28 in the operative position so that it is resistant to accidental displacement.

Other types of arrangements can be used to lock the wick applicator 28 in place in the recess 36 other than the barbs 46A and 46B disclosed above. For example, compressible/collapsible projections (e.g., barbs) may be provided in the recess 36 itself for engagement with cooperating openings or recesses provided in the wick applicator 28. In fact, any detent-type arrangement using a projection and a cooperating surface can be used to fixedly secure the wick applicator 28 in place.

Any type of fluid oral care agents may be utilized in the reservoir of the subject invention. Non-limiting examples of fluids or oral care agents which can be used include antibacterial agents, whitening agents, anti-sensitivity agents, anti-inflammatory agents, anti-attachment agents, plaque indicator agents, flavorants, sensates, and colorants. Moreover, the fluid or oral care agent and/or its medium can be selected to complement a toothpaste formula, such as by coordinating flavors, colors, aesthetics, or active ingredients. A flavor can be administered to create a gradual flavor change during brushing, which presently is not possible using toothpaste alone. Further still, the fluid may be compatible with toothpaste, or may be unstable and/or reactive with typical toothpaste ingredients. The fluid also may be a tooth cleaning agent to boost the overall efficacy of brushing.

The oral care agent can be provided in any suitable vehicle, such as in aqueous solution or in the form of gel or paste. Non-limiting examples of vehicles include water, monohydric alcohols such as ethanol, poly(ethylene oxides) such as polyethylene glycols such as PEG 2M, 5M, 7M, 14M, 23M, 45M, and 90M available from Union Carbide, carboxymethylene polymers such as Carbopol® 934 and 974 available from B.F. Goodrich, and combinations thereof. The selection of a suitable vehicle will be apparent to persons skilled in the art depending on such factors as the properties of the oral care agent and the desired properties of the medium, such as viscosity. Examples of tooth whitening compositions are described in U.S. Pat. Nos. 6,770,266 and 6,669,930, the disclosures of which are hereby incorporated by reference.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

What is claimed is:
1. An oral care implement comprising:
a head;
a handle connected to the head by a neck portion, said handle including an internal fluid reservoir for holding a fluid therein; and
a recess including a first portion extending along said head and a second portion extending into said neck portion and in fluid communication with said fluid reservoir, wherein said second portion of said recess includes an opening and a wall portion, said wall portion being contiguous with said opening;
a wick applicator comprising:
a member comprising a material arranged to enable a fluid to pass therethrough by capillary action and having a first end portion and a second end portion;
wherein said first end portion of said member is arranged to be located within said first portion of said recess and said second end portion of said member is arranged to be located within said second portion of said recess; and
wherein said second end portion of said member comprises at least one projection for engaging said wall portion of said recess to secure said wick applicator in said recess at an operative position in which said wick applicator is in fluid communication with said internal fluid reservoir;
wherein said at least one projection is compressible to pass through said opening and then to decompress, whereupon said projection engages said wall portion to secure said wick applicator in said operative position; and
wherein the wick applicator comprises a central longitudinal axis and the at least one projection of the wick applicator has an undercut surface, the at least one projection is radially compressible to pass through the opening, and the undercut surface of the at least one projection engages the wall portion when the wick applicator is in the operative position.

2. The oral care implement of claim 1 wherein said wick applicator is movable along said central longitudinal axis of said recess to said operative position.

3. The oral care implement of claim 1 wherein said second portion of said member includes a free end and wherein said at least one projection includes a tapered surface which tapers downward from the undercut surface in the direction towards said free end.

4. The oral care implement of claim 3, wherein said tapered surface of said at least one projection is arranged to pass through said opening whereupon said undercut surface of said projection engages said wall portion to secure said wick applicator in said operative position.

5. The oral care implement of claim 1 wherein said at least one projection comprises a pair of barbs extending in a radial direction from said central longitudinal axis of said wick applicator, the barbs being circumferentially spaced apart from one another about the central longitudinal axis.

6. The oral care implement of claim 1 wherein said recess comprises at least one undercut portion, and wherein said wick applicator includes at least one rib, said at least one rib being arranged to cooperate with said at least one undercut portion to enable said wick applicator to be moved along said recess to said operative position.

7. An assembly of a wick applicator and an oral care implement, wherein the wick applicator is secured to the oral care implement, the oral care implement comprising a head, a handle, and a recess, the handle being connected to the head by a neck portion and including an internal fluid reservoir for holding a fluid therein, the recess including a first portion extending along the head and a second portion extending into the neck portion and in fluid communication with the fluid reservoir, the wick applicator being received in the recess, said wick applicator comprising:
a member formed of a material arranged to enable a fluid to pass therethrough by capillary action and having a first end portion and a second end portion;

wherein said first end portion of said member is located within the first portion of the recess and said second end portion of said member is located within the second portion of the recess;
wherein said second end portion of said member comprises at least one projection engaging at least one cooperating portion of the recess to secure said wick applicator in the recess in an operative position in which said wick applicator is in fluid communication with the internal fluid reservoir;
wherein said second portion of said recess includes an opening and a wall portion, said wall portion being contiguous with said opening; and
wherein said at least one projection is compressible to pass through said recess, and said projection decompresses upon said at least one projection passing through said opening with said projection engaging said wall portion to secure said wick applicator in said operative position.

8. The assembly of claim 7 wherein said second end portion of said member includes a free end and wherein said at least one projection includes a tapered surface which tapers downward from an undercut surface in the direction towards said free end.

9. The assembly of claim 8 wherein said undercut surface of said projection is engaged with said wall portion to secure said wick applicator in the operative position.

10. The assembly of claim 7 wherein said wick applicator comprises a central longitudinal axis and wherein said at least one projection comprises a pair of barbs extending in a radial direction from said central longitudinal axis.

11. The assembly of claim 7 wherein said recess comprises at least one undercut portion, and wherein said wick applicator includes at least one rib, said at least one rib cooperating with said at least one undercut portion.

12. A method of securing a wick applicator to an oral care implement, said method comprising:
providing an oral care implement comprising a head, a handle and a recess, said handle being connected to said head by a neck portion and including an internal fluid reservoir for holding a fluid therein, said recess including a first portion extending along said head and a second portion extending into said neck portion, wherein said second portion of said recess includes an opening and a wall portion, said wall portion being contiguous with said opening;
providing a wick applicator formed of a material arranged to enable a fluid to pass therethrough by capillary action, said wick applicator comprising a member having a first end portion, a second end portion and at least one projection extending outward from said second end portion, wherein said at least one projection is compressible; and
inserting said wick applicator into said recess, said at least one projection compressing to fit through said opening and then decompressing after said at least one projection has fully passed through said opening such that said first end portion of said member is in said first portion of said recess and said second end portion of said member is in said second portion of said recess, wherein said at least one projection engages said wall portion of said recess to secure said wick applicator in said recess at an operative position in which said wick applicator is in fluid communication with said internal fluid reservoir.

13. The method of claim 12 wherein said recess has a central longitudinal axis and wherein inserting said wick applicator into said recess comprises moving said wick applicator along said central longitudinal axis of said recess to said operative position.

14. The method of claim 13 wherein said at least one projection compresses in a radial direction with respect to the central longitudinal axis to pass through said opening when said wick applicator is moved along said central longitudinal axis of said recess.

15. The method of claim 14 wherein said second portion of said member terminates in a free end, said at least one projection including a tapered surface which tapers downward from an undercut surface in the direction towards said free end, and wherein upon said tapered surface of said at least one projection passing entirely through said opening said undercut surface of said projection engages said wall portion to secure said wick applicator in said operative position.

16. The method of claim 13 further comprising providing said wick applicator with at least one rib extending along said central longitudinal axis and providing said oral care implement with at least one undercut portion extending along said recess, whereupon said at least one rib cooperates with said at least one undercut portion to guide the movement of said wick applicator along said central longitudinal axis to said operative position.

17. The assembly of claim 7 wherein the wick applicator comprises a plurality of serrations formed on a portion of the first end portion of the member that is exposed on a rear surface of the head.

18. The assembly of claim 7 wherein first portion of the recess is formed into a rear surface of the head and further comprising an opening into the recess at a distal end of the head.

19. The method of claim 12 wherein said recess comprises a passageway defined by an inner wall, the passageway extending through the head and neck portion of the oral care implement and terminating at the opening, wherein inserting said wick applicator into said recess comprises inserting the second end portion of said member into the first portion of said recess and moving said wick applicator within said passageway along a central longitudinal axis of said recess, said at least one projection compressing as it contacts said inner wall of said passageway to enable said second end portion of said member to enter into and pass through the passageway.

* * * * *